US007787204B2

(12) United States Patent
Cherubini et al.

(10) Patent No.: US 7,787,204 B2
(45) Date of Patent: Aug. 31, 2010

(54) ERROR CORRECTION CODING OF LONGITUDINAL POSITION INFORMATION

(75) Inventors: Giovanni Cherubini, Rueschlikon (CH); Roy Daron Cideciyan, Rueschlikon (CH); Evangelos S. Eleftheriou, Rueschlikon (CH); Robert Allen Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 12/052,688

(22) Filed: Mar. 20, 2008

(65) Prior Publication Data

US 2009/0237832 A1 Sep. 24, 2009

(51) Int. Cl.
*G11B 5/09* (2006.01)
*G11B 5/584* (2006.01)
(52) U.S. Cl. .................................. 360/48; 360/77.12
(58) Field of Classification Search .................. None
See application file for complete search history.

(56) References Cited

U.S. PATENT DOCUMENTS

| 4,766,507 | A | | 8/1988 | Kashida et al. |
|---|---|---|---|---|
| 5,930,065 | A | * | 7/1999 | Albrecht et al. ............ 360/72.2 |
| 6,791,781 | B2 | | 9/2004 | Bui et al. |
| 7,158,338 | B2 | * | 1/2007 | Koski et al. ............... 360/77.12 |
| 2003/0030931 | A1 | | 2/2003 | Maple et al. |
| 2006/0085718 | A1 | | 4/2006 | Jaquette et al. |
| 2007/0044007 | A1 | | 2/2007 | Cideciyan et al. |

OTHER PUBLICATIONS

Barrett et al., "Timing-Based Track-Following Servo for Linear Tape Systems", IEEE Transactions on Magnetics, Jul. 1998, pp. 1872-1877, vol. 34, No. 4, IEEE.
Jaquette, "LTO: A better format for mid-range tape", IBM J. Res. & Dev., pp. 429-444, IBM.
Hoffman et al., "Position Determination of an Acoustic Burst Along a Sagnac Interferometer", Journal of Lightwave Technology, Feb. 2004, pp. 494-498; vol. 22, No. 2, IEEE.
Cideciyan et al., "Error Correction Capability for Longitudinal Position Data in a Tape Storage System", U.S. Appl. No. 12/033,440, filed Feb. 19, 2008.
ECMA, "Data Interchange on 12,7 mm 384-Track Magnetic Tape Cartridges—Ultrium-1 Format", Standard ECMA-319, Jun. 2001, pp. 1-141, ECMA.

* cited by examiner

*Primary Examiner*—Daniell L Negrón
(74) *Attorney, Agent, or Firm*—Dale F. Regelman; Quarles & Brady LLP

(57) ABSTRACT

A sequential data storage medium, comprising a sequence of plurality of servo patterns that provide lateral position information and longitudinal position information, wherein each of the plurality of servo patterns comprises a first burst comprising a first plurality of pulses, a second burst comprising a second plurality of pulses, a third burst comprising a third plurality of pulses, and a fourth burst comprising a fourth plurality of pulses. The spacings between the first plurality of pulses, in combination with the spacings between the second plurality of pulses, encode a first bit without affecting the recovery of lateral position information. The spacings between the third plurality of pulses, in combination with the spacings between the fourth plurality of pulses, encode a second bit without affecting the recovery of lateral position information. The sequence of plurality of servo patterns comprises a sequence of the first bits and a sequence of the second bits to form an error-correction codeword providing error-correction capability.

10 Claims, 15 Drawing Sheets

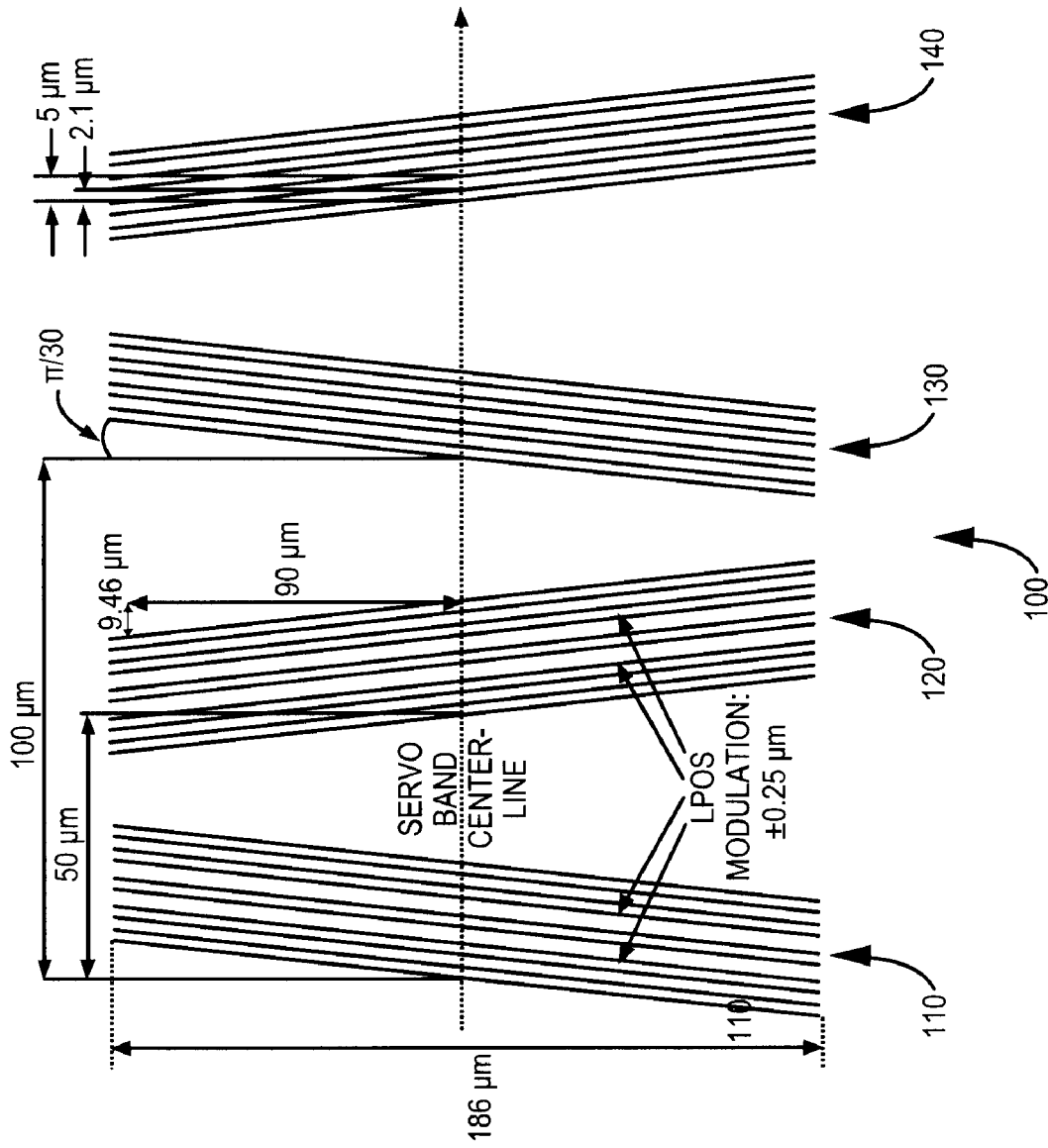

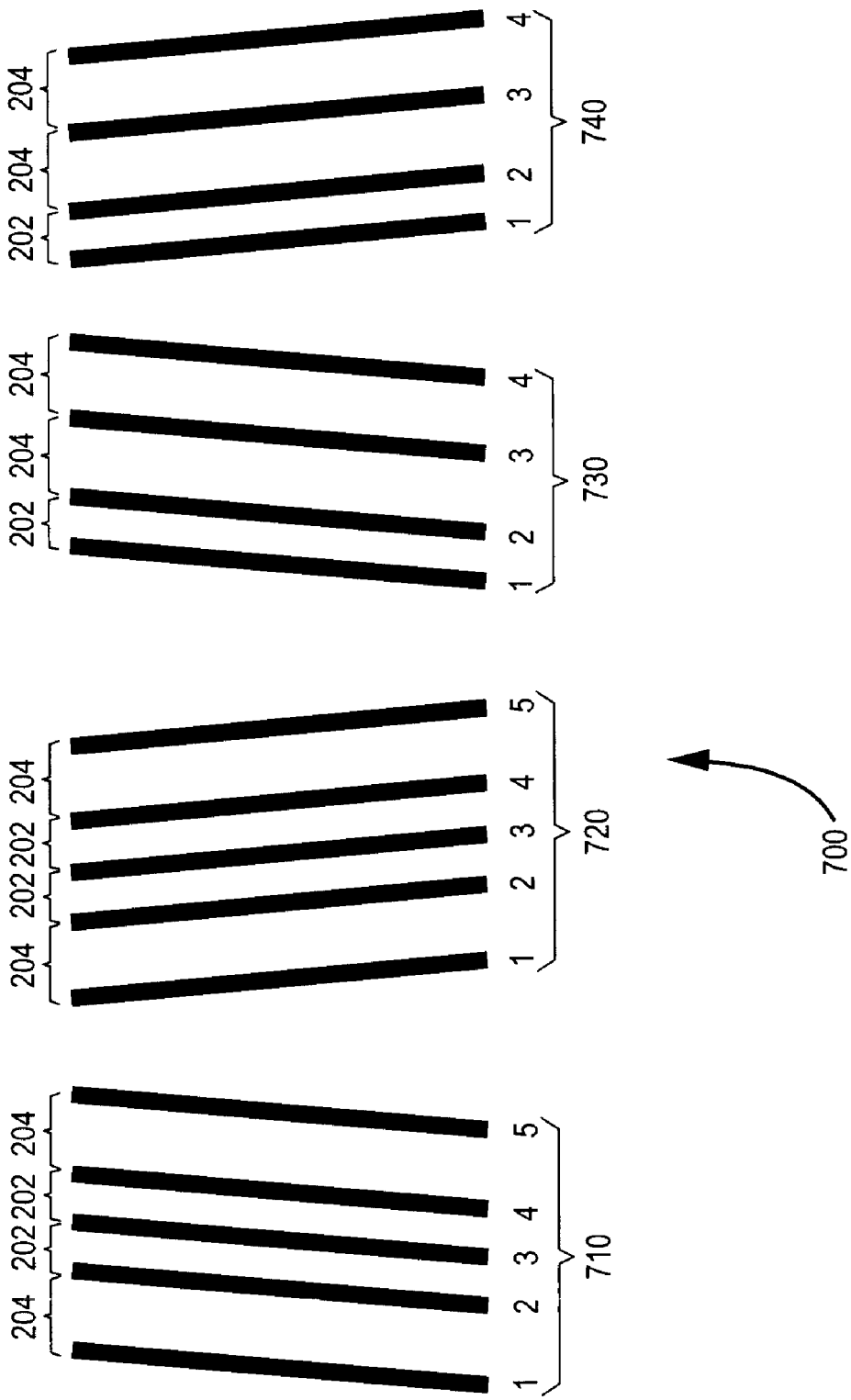

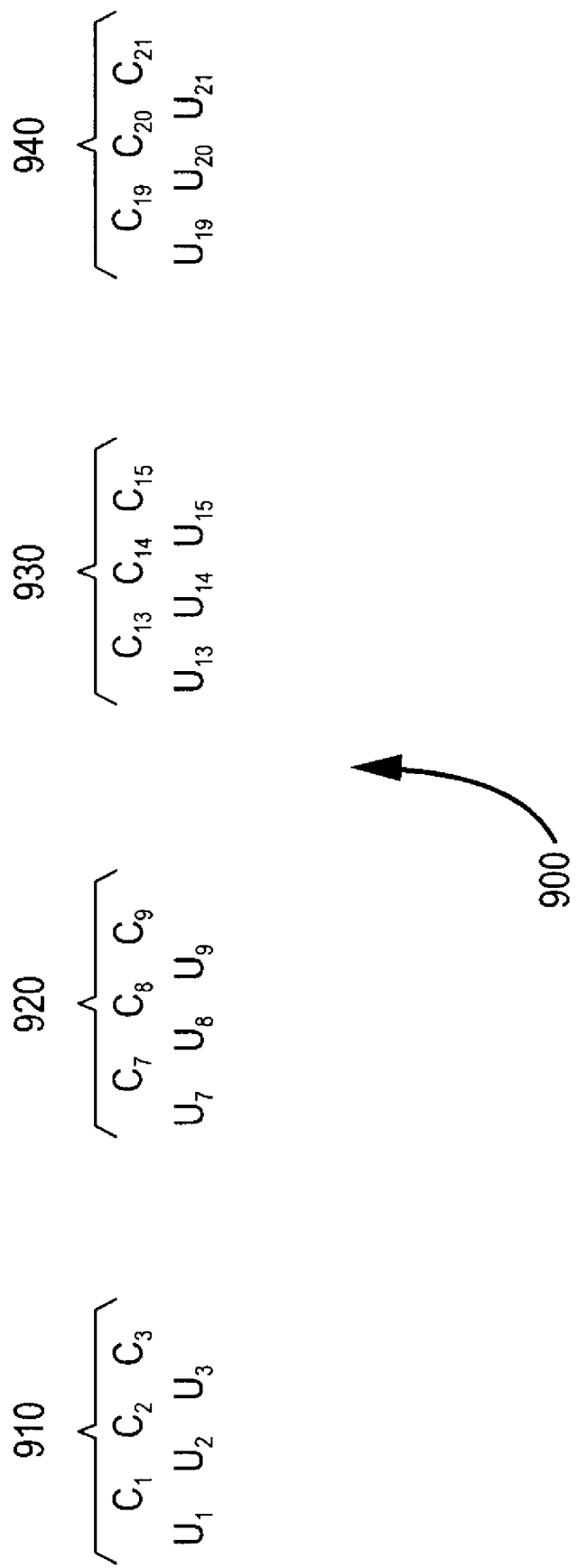

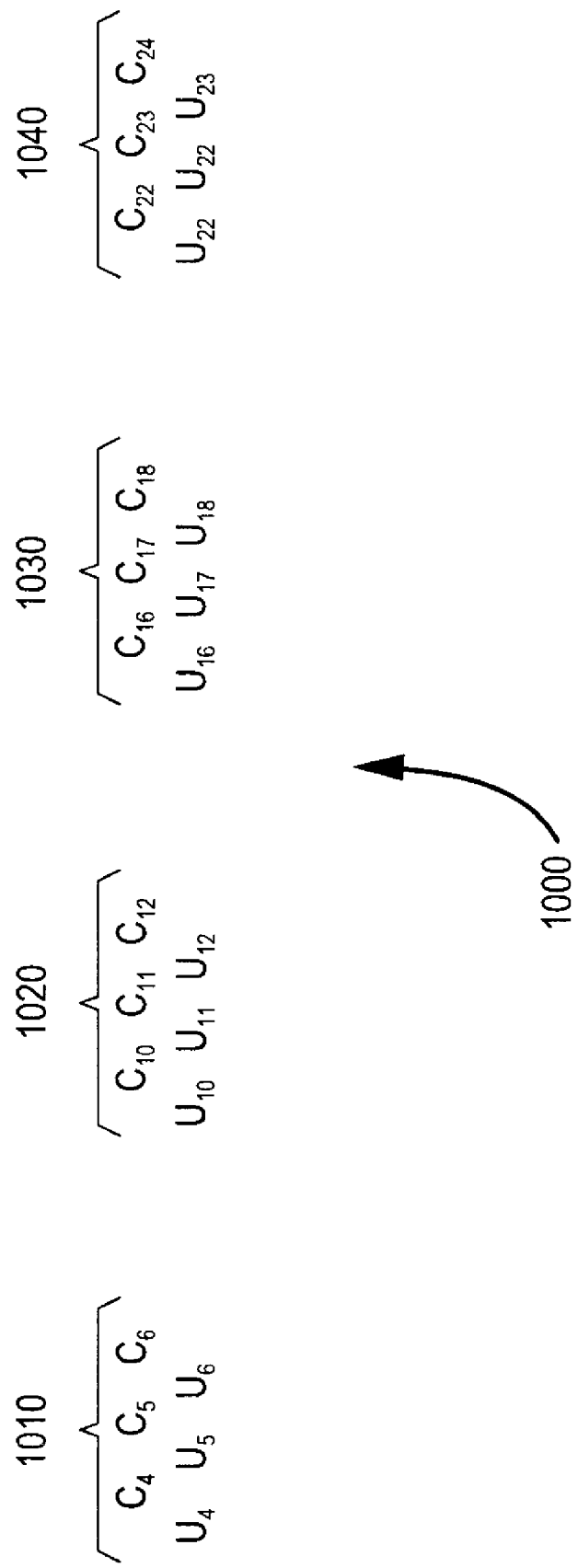

FIG. 12

INFORMATION BITS: $t_1, \ldots, t_4$

PARITY BITS: $p_1, \ldots, p_4$ $\oplus$: EXCLUSIVE-OR GATE (MODULO=2 ADDITION)

$0 \oplus 0 = 0$
$0 \oplus 1 = 1$
$1 \oplus 0 = 1$
$1 \oplus 1 = 0$ $p_1 = t_1 \oplus t_2 \oplus t_4$
$p_2 = t_1 \oplus t_3 \oplus t_4$
$p_3 = t_2 \oplus t_3 \oplus t_4$
$p_4 = t_1 \oplus t_2 \oplus t_3$

ERROR CORRECTION CODING OF LONGITUDINAL POSITION INFORMATION

FIELD OF THE INVENTION

Applicants' invention relates to error correction coding of longitudinal position information.

BACKGROUND OF THE INVENTION

Timing-based servo (TBS) is a technology developed for linear tape drives. In TBS systems, recorded servo patterns consist of transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current midrange tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. Detection of LPOS bits may also be performed by a matched-filter detector, as described in the application having Ser. No. 11/205,713, and owned by the common assignee hereof.

Traditionally, the detection of LPOS information bits is based on the observation of the shifts of the arrival times of the dibit peaks within the servo bursts at the servo reader output. It is known in the art to encode by pulse position modulation an LPOS word comprising 36 bits of information in a non-data region of a sequential data storage medium, such as a magnetic tape. Each encoded LPOS word in the standard ECMA-319 on data interchange on 12.7 mm 384-track magnetic tape cartridges relates to a specific absolute longitudinal address, and appears every 7.2 mm down the tape. Using prior art methods, an LPOS word comprises 36 individual servo patterns, i.e. frames, wherein each frame encodes one bit of information. The LPOS values of two consecutive LPOS words differ by one. Therefore, a tape drive can position a data/servo head assembly at a specified LPOS address thereby achieving a longitudinal resolution of about 7.2 mm.

A read/write assembly comprising two servo heads spans a data band and two servo bands disposed adjacent that data band. In the event one servo head is rendered inoperative, then only one servo head can be used to laterally position the read/write head. Bit errors in the operative servo channel can cause a stop-write condition. Alternatively, a servo band may become damaged, or may not comprise useful information resulting from media damage.

SUMMARY OF THE INVENTION

Applicants' invention comprises a sequential data storage medium, such as for example and without limitation a magnetic tape, comprising a sequence of plurality of servo patterns encoded therein, which provide lateral position information and LPOS information. Each servo pattern comprises a first burst comprising a plurality of pulses, a second burst comprising a plurality of pulses, a third burst comprising a plurality of pulses, and a fourth burst comprising a plurality of pulses. The spacings of the plurality of pulses comprising the first burst, in combination with the spacings of the plurality of pulses comprising the second burst, encode a first bit without affecting the recovery of lateral position information. The spacings of the plurality of pulses comprising the third burst, in combination with the spacings of the plurality of pulses comprising the fourth burst, encode a second bit without affecting the recovery of lateral position information. The sequence of plurality of servo patterns then comprises a sequence of bits that form an error-correction codeword providing error-correction capability.

Applicants' invention further comprises a method to encode information in a non-data region of Applicants' sequential data storage medium. In certain embodiments, Applicants' method provides higher reliability of detection of LPOS information and lower decoding latency as compared to prior art approaches that comprise error correction capabilities for recovering LPOS information.

In certain embodiments of Applicants' method, the first bit comprises an LPOS information bit, whereas the second bit comprises a "parity bit". In certain of these parity bit embodiments, Applicants' method utilizes a Reed Solomon error correction code to correct errors in decoded LPOS information. In other embodiments of Applicants' method, a Hamming error correction code is utilized to correct errors in decoded LPOS information. In further embodiments of Applicants' method, a repetition code is utilized, wherein the value of the first bit is the same as the value of the second bit.

BRIEF DESCRIPTION OF THE DRAWINGS

The invention will be better understood from a reading of the following detailed description taken in conjunction with the drawings in which like reference designators are used to designate like elements, and in which:

FIG. 1B recites data regarding the dimensions of the bursts and pulses comprising the servo pattern of FIG. 1A, as specified for LTO tape drives;

FIG. 7 shows a fourth embodiment of Applicants' servo pattern used to encode two bits of information;

FIG. 9 shows a first portion of the LPOS information of FIG. 8A comprising a first LPOS word comprising four 3-bit symbols;

FIG. 10 shows a second portion of the LPOS information of FIG. 8A comprising a second LPOS word comprising four 3-bit symbols, wherein the first LPOS word of FIG. 9 is interleaved with the second LPOS word of FIG. 10;

FIG. 12 illustrates the systematic encoder generating codewords from a [8,4,4] extended Hamming code over Galois field GF(2).

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In sequential data storage media, such as for example magnetic tape storage media, servo patterns are encoded in non-data portions of the medium. Those servo patterns are used to position a read/write head with respect to a plurality of data tracks, to provide sync data, to provide manufacturer data, and to determine linear position ("LPOS") along the length of the medium.

Figure 1A:
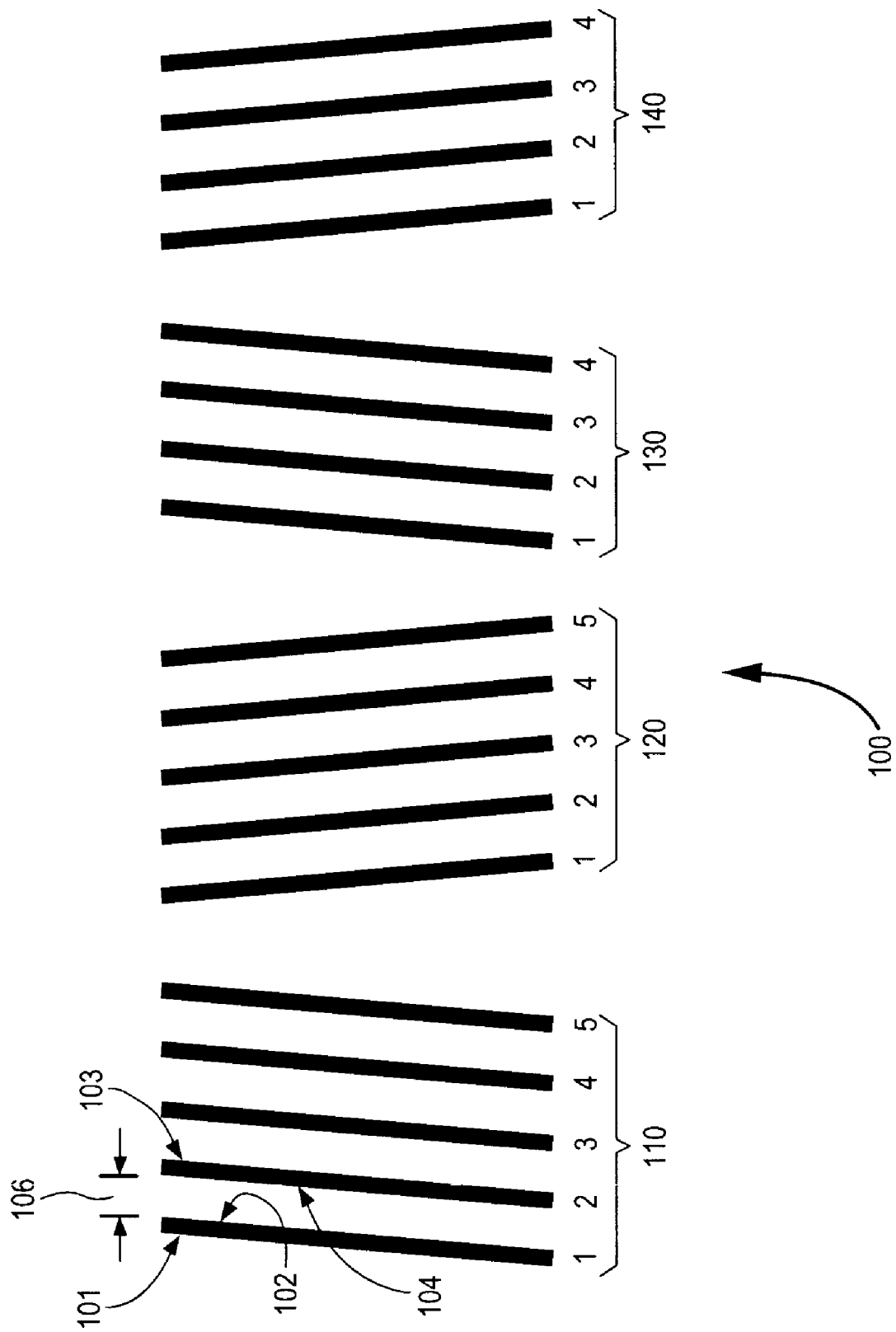
FIG. 1A shows a servo pattern comprising four bursts, wherein each of those four bursts comprises a plurality of pulses.

Referring to FIGS. 1A and 1B, recorded servo pattern 100 consists of transitions with two different azimuthal slopes. Read/write head position is derived from the relative timing of pulses generated by a narrow head reading the pattern. Servo pattern 100 also allows the encoding of LPOS information without affecting the generation of the transversal position error signal ("PES"). FIG. 1B illustrates the format of servo patterns in LTO tape drives.

Figure 1C:
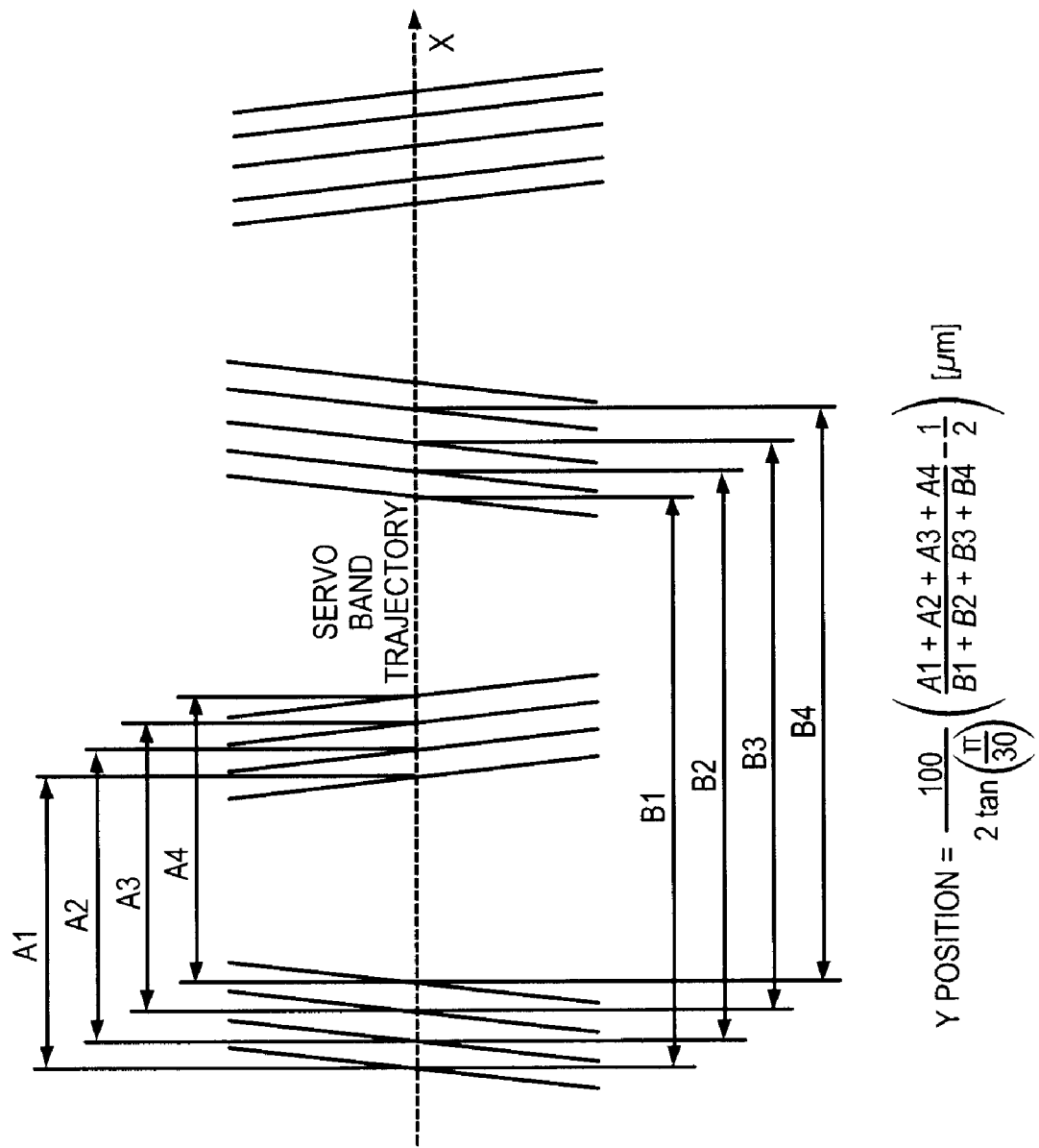
FIG. 1C illustrates the computation of the lateral y-position estimate.

FIG. 1C illustrates the computation of the lateral y-position estimate from the ratio of the sum of A intervals and the sum of B intervals in LTO tape drives. The position error signal is then obtained from the y-position estimate.

LPOS information is encoded by shifting transitions from the nominal pattern positions shown in FIG. 1A. In tape systems there are typically available two dedicated servo channels from which LPOS information as well as PES can be derived.

Servo pattern 100 comprises a first burst 110 comprising five pulses, wherein each of those five pulses comprises a first azimuthal slope. First pulse 101 comprises edge 102, wherein edge 102 faces second pulse 103. Second pulse 103 comprises edge 104 which faces first pulse 101. In the illustrated embodiment of FIG. 1A, edge 102 is disposed a distance 106 from edge 104.

Distance 106 comprises a nominal spacing between neighboring pulses in servo pattern 100. Further in the illustrated embodiment of FIG. 1A, each of the five pulses in burst 110 is separated from neighboring pulses by that same nominal spacing 106.

Servo pattern 100 further comprises a second burst 120 comprising five pulses, wherein each of those five pulses comprises a second azimuthal slope, and wherein each of the five pulses in burst 120 is separated from neighboring pulses by nominal spacing 106. Servo pattern 100 further comprises a third burst 130 comprising four pulses, wherein each of those four pulses comprises the first azimuthal slope, and wherein each of the four pulses in burst 130 is separated from neighboring pulses by nominal spacing 106. Servo pattern 100 further comprises a fourth burst 140 comprising four pulses, wherein each of those four pulses comprises the second azimuthal slope, and wherein each of the four pulses in burst 140 is separated from neighboring pulses by nominal spacing 106.

Because all of the pulses disposed in servo pattern 100 are separated from neighboring pulses by the nominal spacing 106, servo pattern 100 does not encode any LPOS information. Prior art methods that comprise error-correction capabilities for recovering LPOS information adjust the spacings between pulses in burst 110 and in burst 120 to encode LPOS data. Using these prior art servo patterns and methods, the spacings between neighboring pulses in bursts 130 and 140 remain set at the nominal spacing 106. As a result, prior art servo patterns and methods do not encode data for error-correction purposes in bursts 130 and 140.

Figure 2:
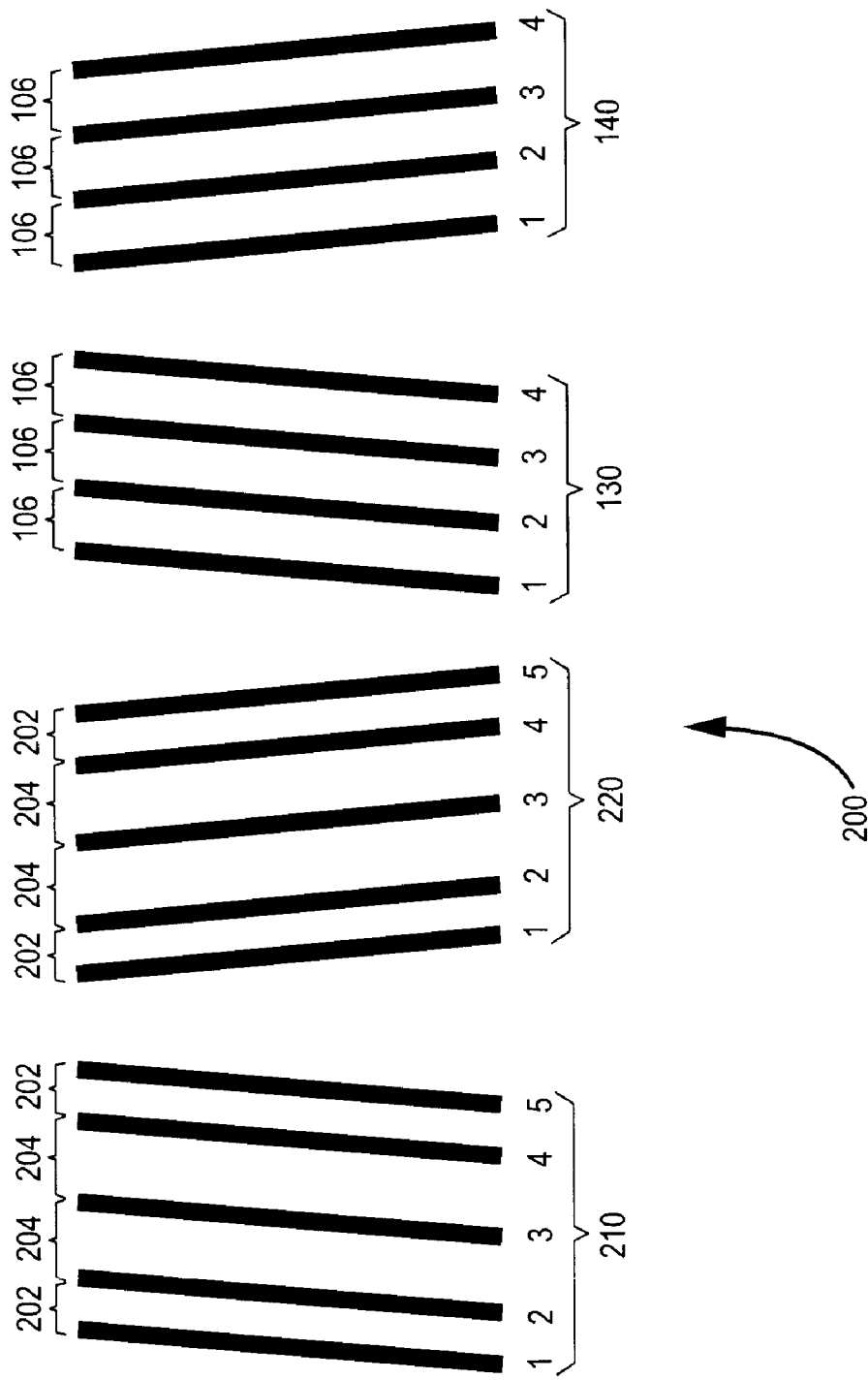
FIG. 2 shows a first prior art servo pattern used to encode a single bit of information.

FIG. 2 shows prior art servo pattern 200. The spacings between the pulses in bursts 210 and 220 have been altered with respect to the nominal spacing 106 (FIG. 1A). Using prior art methods, servo pattern 200 encodes a bit of information, wherein that bit is decoded to comprise a value of "1".

Pulse 2 in burst 210 is separated from pulse 1 in burst 210 by spacing 202, wherein spacing 202 is less than nominal spacing 106. In addition, pulse 2 in burst 210 is separated from pulse 3 in burst 210 by spacing 204, wherein spacing 204 is greater than nominal spacing 106. Pulse 4 in burst 210 is separated from pulse 3 in burst 210 by spacing 204, wherein spacing 204 is greater than nominal spacing 106. In addition, pulse 4 in burst 210 is separated from pulse 5 in burst 210 by spacing 202, wherein spacing 202 is less than nominal spacing 106.

In the illustrated embodiment of FIG. 2, the spacings between the pulses in burst 220 have been altered in similar fashion as in burst 210 with respect to the nominal spacing 106 (FIG. 1A). Pulse 2 in burst 220 is separated from pulse 1 in burst 220 by spacing 202, wherein spacing 202 is less than nominal spacing 106. In addition, pulse 2 in burst 220 is separated from pulse 3 in burst 220 by spacing 204, wherein spacing 204 is greater than nominal spacing 106. Pulse 4 in burst 220 is separated from pulse 3 in burst 220 by spacing 204, wherein spacing 204 is greater than nominal spacing 106. In addition, pulse 4 in burst 220 is separated from pulse 5 in burst 220 by spacing 202, wherein spacing 202 is less than nominal spacing 106.

Figure 3:
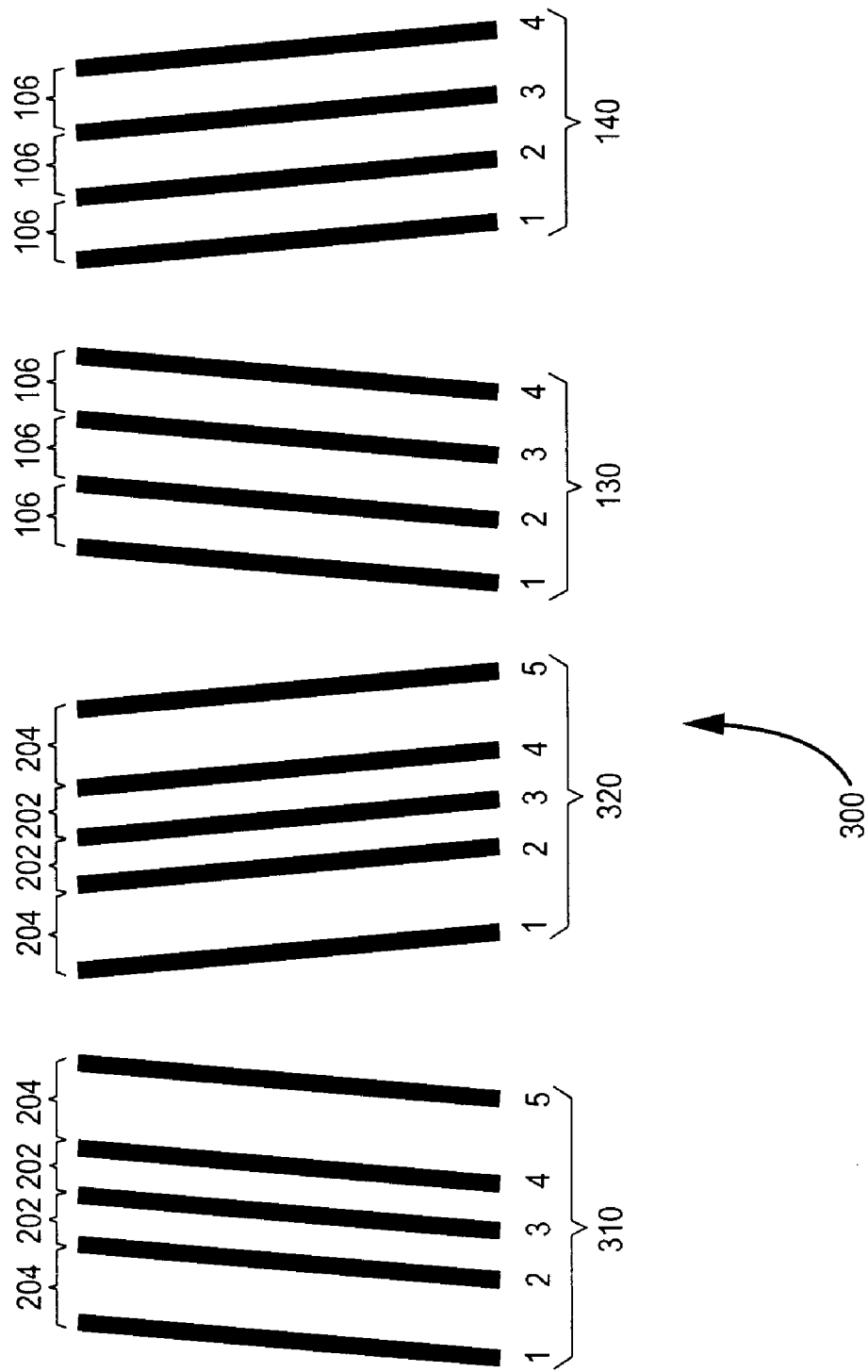
FIG. 3 shows a second prior art servo pattern used to encode a single bit of information.

FIG. 3 shows prior art servo pattern 300. The spacings between the pulses in bursts 310 and 320 have been altered with respect to the nominal spacing 106 (FIG. 1A). Using prior art methods, servo pattern 300 encodes a bit of information, wherein that bit is decoded to comprise a value of "0".

Pulse 2 in burst 310 is separated from pulse 1 in burst 210 by spacing 204, wherein spacing 204 is greater than nominal spacing 106. In addition, pulse 2 in burst 310 is separated from pulse 3 in burst 310 by spacing 202, wherein spacing 202 is less than nominal spacing 106. Pulse 4 in burst 310 is separated from pulse 3 in burst 310 by spacing 202, wherein spacing 202 is less than nominal spacing 106. In addition, pulse 4 in burst 310 is separated from pulse 5 in burst 310 by spacing 204, wherein spacing 204 is greater than nominal spacing 106.

In the illustrated embodiment of FIG. 3, the spacings between the pulses in burst 320 have been altered in similar fashion as in burst 310 with respect to the nominal spacing 106 (FIG. 1A). Pulse 2 in burst 320 is separated from pulse 1 in burst 320 by spacing 204, wherein spacing 204 is greater than nominal spacing 106. In addition, pulse 2 in burst 320 is separated from pulse 3 in burst 320 by spacing 202, wherein spacing 202 is less than nominal spacing 106. Pulse 4 in burst 320 is separated from pulse 3 in burst 320 by spacing 202, wherein spacing 202 is less than nominal spacing 106. In addition, pulse 4 in burst 320 is separated from pulse 5 in burst 320 by spacing 204, wherein spacing 204 is greater than nominal spacing 106.

Figure 4:
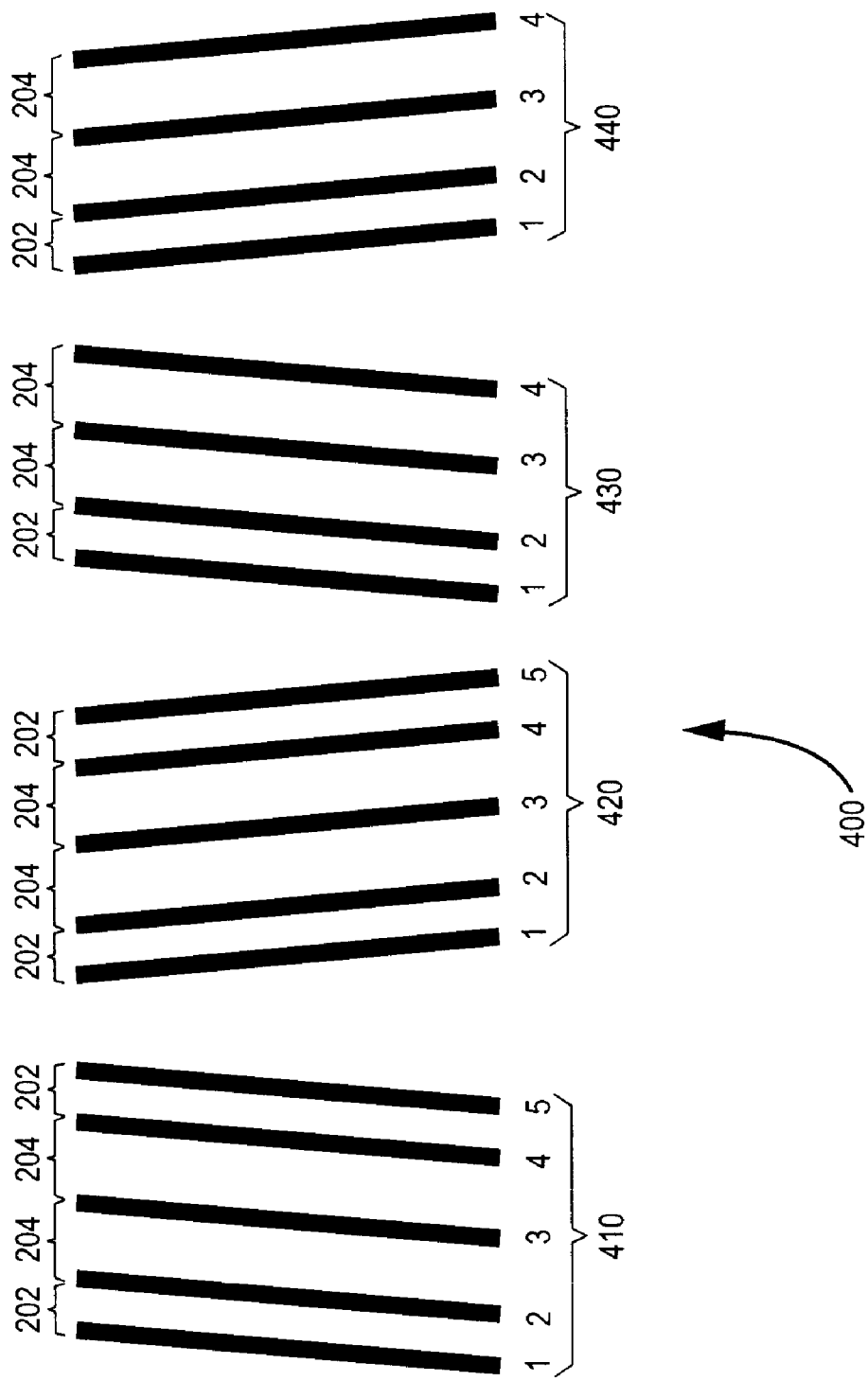
FIG. 4 shows a first embodiment of Applicants' servo pattern used to encode two bits of information.

FIG. 4 shows Applicants' servo pattern 400. The spacings between the pulses in bursts 410 and 420 have been altered with respect to the nominal spacing 106 (FIG. 1A) to encode a first bit of information. In addition, the spacings between the pulses in bursts 430 and 440 have been altered with respect to the nominal spacing 106 (FIG. 1A) to encode a parity bit for error-correction purposes. Using Applicants' method, servo pattern 400 thus encodes two bits, the first representing a bit of information, the second representing a parity bit for error-correction purposes. In certain embodiments, those two bits represent the pair of binary symbols (1,1), where both the information bit and the parity bit take the logical value '1'. Note that the introduction of the parity bit does not affect the computation of the y-position estimate, as the sum of the A intervals and the sum of the B intervals yield the same value as in the case of nominal spacings (FIG. 1C).

Pulse 2 in burst 410 is separated from pulse 1 in burst 410 by spacing 202, wherein spacing 202 is less than nominal spacing 106. In addition, pulse 2 in burst 410 is separated from pulse 3 in burst 410 by spacing 204, wherein spacing 204 is greater than nominal spacing 106. Pulse 4 in burst 410 is separated from pulse 3 in burst 410 by spacing 204, wherein spacing 204 is greater than nominal spacing 106. In addition, pulse 4 in burst 410 is separated from pulse 5 in burst 410 by spacing 202, wherein spacing 202 is less than nominal spacing 106.

In the illustrated embodiment of FIG. 4, the spacings between the pulses in burst 420 have been altered in similar fashion as in burst 410 with respect to the nominal spacing 106 (FIG. 1A). Pulse 2 in burst 420 is separated from pulse 1 in burst 420 by spacing 202, wherein spacing 202 is less than nominal spacing 106. In addition, pulse 2 in burst 420 is separated from pulse 3 in burst 420 by spacing 204, wherein spacing 204 is greater than nominal spacing 106. Pulse 4 in burst 420 is separated from pulse 3 in burst 420 by spacing 204, wherein spacing 204 is greater than nominal spacing 106. In addition, pulse 4 in burst 420 is separated from pulse 5 in burst 420 by spacing 202, wherein spacing 202 is less than nominal spacing 106.

Pulse 2 in burst 430 is separated from pulse 1 in burst 430 by spacing 202, wherein spacing 202 is less than nominal spacing 106. In addition, pulse 2 in burst 430 is separated from pulse 3 in burst 430 by spacing 204, wherein spacing 204 is greater than nominal spacing 106. Pulse 4 in burst 430 is separated from pulse 3 in burst 430 by spacing 204, wherein spacing 204 is greater than nominal spacing 106.

In the illustrated embodiment of FIG. 4, the spacings between the pulses in burst 440 have been altered in similar fashion as in burst 430 with respect to the nominal spacing 106 (FIG. 1A). Pulse 2 in burst 440 is separated from pulse 1 in burst 440 by spacing 202, wherein spacing 202 is less than nominal spacing 106. In addition, pulse 2 in burst 440 is separated from pulse 3 in burst 440 by spacing 204, wherein spacing 204 is greater than nominal spacing 106. Pulse 4 in burst 440 is separated from pulse 3 in burst 440 by spacing 204, wherein spacing 204 is greater than nominal spacing 106.

Figure 5:
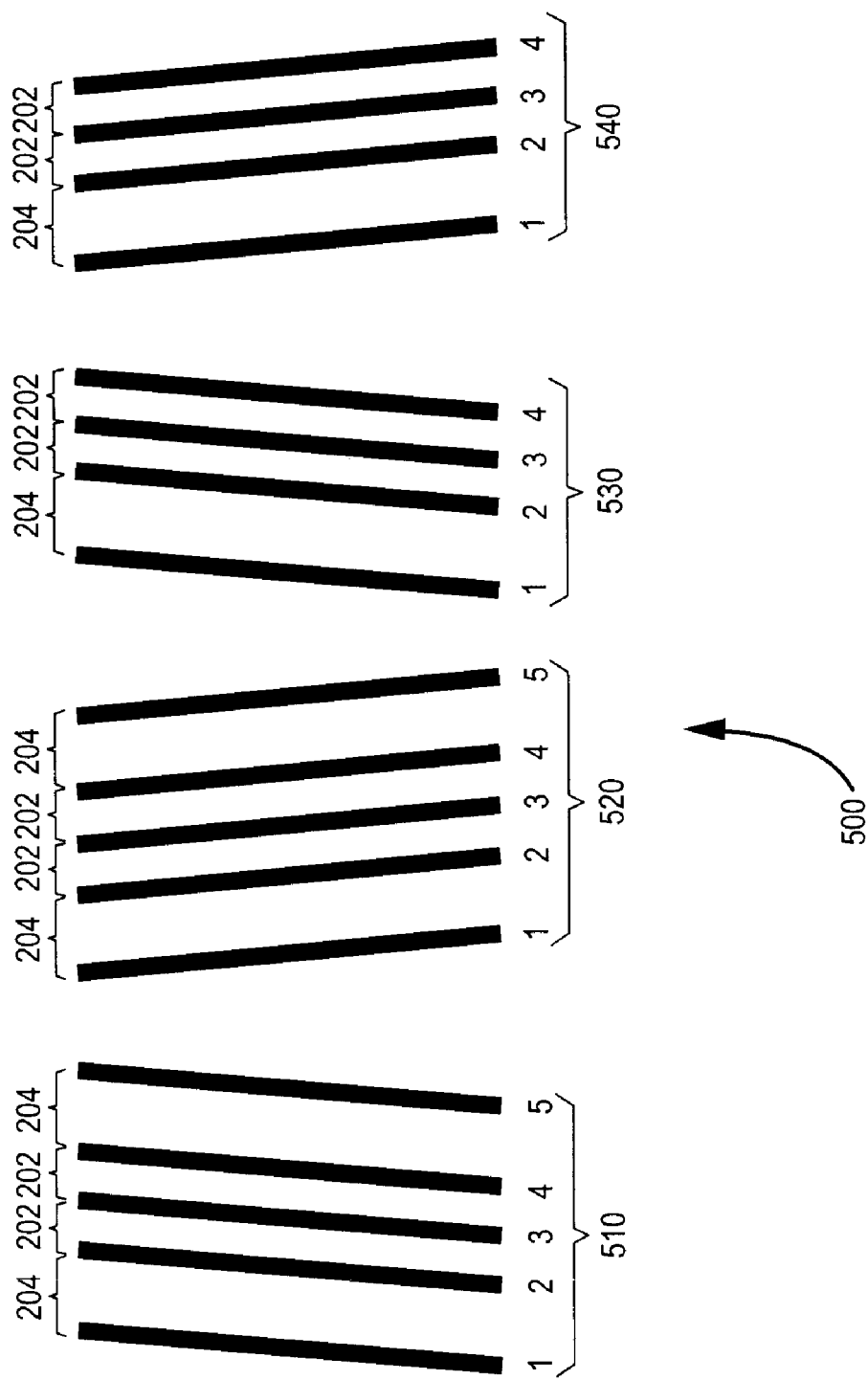
FIG. 5 shows a second embodiment of Applicants' servo pattern used to encode two bits of information.

FIG. 5 shows Applicants' servo pattern 500. The spacings between the pulses in bursts 510 and 520 have been altered with respect to the nominal spacing 106 (FIG. 1A) to encode a first bit of information. In addition, the spacings between the pulses in bursts 530 and 540 have been altered with respect to the nominal spacing 106 (FIG. 1A) to encode a parity bit for error-correction purposes. Using Applicants' method, servo pattern 500 thus encodes two bits, the first representing a bit of information, the second representing a parity bit for error-correction purposes. In certain embodiments, those two bits represent the pair of binary symbols (0,0), where both the information bit and the parity bit take the logical value '0'. Note that the introduction of the parity bit does not affect the computation of the y-position estimate, as the sum of the A intervals and the sum of the B intervals yield the same value as in the case of nominal spacings (FIG. 1C).

Pulse 2 in burst 510 is separated from pulse 1 in burst 510 by spacing 204, wherein spacing 204 is greater than nominal spacing 106. In addition, pulse 2 in burst 510 is separated from pulse 3 in burst 510 by spacing 202, wherein spacing 202 is less than nominal spacing 106. Pulse 4 in burst 510 is separated from pulse 3 in burst 510 by spacing 202, wherein spacing 202 is less than nominal spacing 106. In addition, pulse 4 in burst 510 is separated from pulse 5 in burst 510 by spacing 204, wherein spacing 204 is greater than nominal spacing 106.

In the illustrated embodiment of FIG. 5, the spacings between the pulses in burst 520 have been altered in similar fashion as in burst 510 with respect to the nominal spacing 106 (FIG. 1A). Pulse 2 in burst 520 is separated from pulse 1 in burst 520 by spacing 204, wherein spacing 204 is greater than nominal spacing 106. In addition, pulse 2 in burst 520 is separated from pulse 3 in burst 520 by spacing 202, wherein spacing 202 is less than nominal spacing 106. Pulse 4 in burst 520 is separated from pulse 3 in burst 520 by spacing 202, wherein spacing 202 is less than nominal spacing 106. In addition, pulse 4 in burst 520 is separated from pulse 5 in burst 520 by spacing 204, wherein spacing 204 is greater than nominal spacing 106.

Pulse 2 in burst 530 is separated from pulse 1 in burst 530 by spacing 204, wherein spacing 204 is greater than nominal spacing 106. In addition, pulse 2 in burst 530 is separated from pulse 3 in burst 530 by spacing 202, wherein spacing 202 is less than nominal spacing 106. Pulse 4 in burst 530 is separated from pulse 3 in burst 530 by spacing 202, wherein spacing 202 is less than nominal spacing 106.

In the illustrated embodiment of FIG. 5, the spacings between the pulses in burst 540 have been altered in similar fashion as in burst 530 with respect to the nominal spacing 106 (FIG. 1A). Pulse 2 in burst 540 is separated from pulse 1 in burst 540 by spacing 204, wherein spacing 204 is greater than nominal spacing 106. In addition, pulse 2 in burst 540 is separated from pulse 3 in burst 540 by spacing 202, wherein spacing 202 is less than nominal spacing 106. Pulse 4 in burst 540 is separated from pulse 3 in burst 540 by spacing 202, wherein spacing 202 is less than nominal spacing 106.

Figure 6:
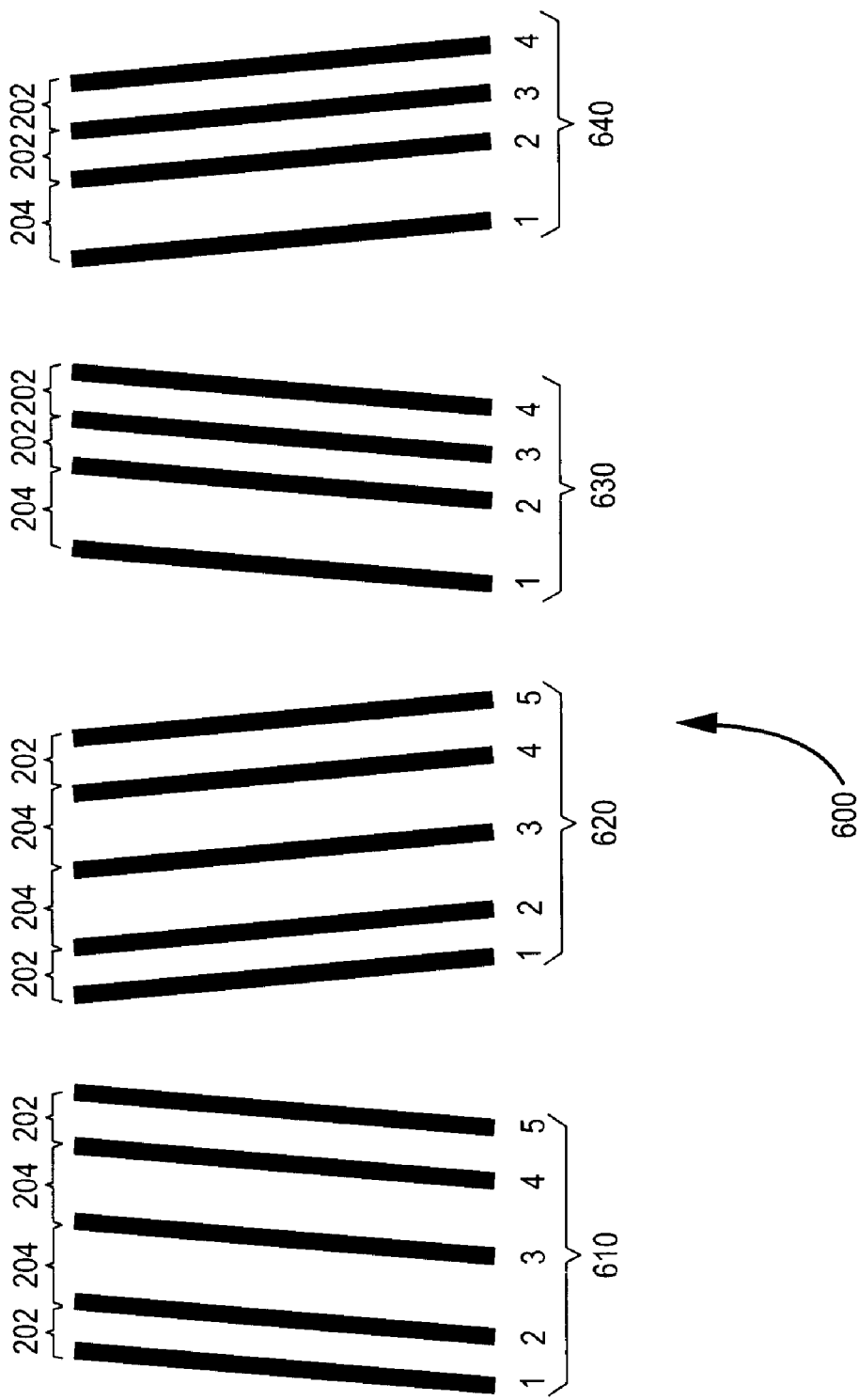
FIG. 6 shows a third embodiment of Applicants' servo pattern used to encode two bits of information.

FIG. 6 shows Applicants' servo pattern 600. The spacings between the pulses in bursts 610 and 620 have been altered with respect to the nominal spacing 106 (FIG. 1A) to encode a first bit of information. In addition, the spacings between the pulses in bursts 630 and 640 have been altered with respect to the nominal spacing 106 (FIG. 1A) to encode a parity bit for error-correction purposes. Using Applicants' method, servo pattern 600 thus encodes two bits, the first representing a bit of information, the second representing a parity bit for error-correction purposes. In certain embodiments, those two bits represent the pair of binary symbols (1,0), where the information bit takes the logical value '1' and the parity bit takes the logical value '0'. Note that the introduction of the parity bit does not affect the computation of the y-position estimate, as the sum of the A intervals and the sum of the B intervals yield the same value as in the case of nominal spacings (FIG. 1C).

Pulse 2 in burst 610 is separated from pulse 1 in burst 610 by spacing 202, wherein spacing 202 is less than nominal spacing 106. In addition, pulse 2 in burst 610 is separated from pulse 3 in burst 610 by spacing 204, wherein spacing 204 is greater than nominal spacing 106. Pulse 4 in burst 610 is separated from pulse 3 in burst 610 by spacing 204, wherein spacing 204 is greater than nominal spacing 106. In addition, pulse 4 in burst 610 is separated from pulse 5 in burst 610 by spacing 202, wherein spacing 202 is less than nominal spacing 106.

In the illustrated embodiment of FIG. 6, the spacings between the pulses in burst 620 have been altered in similar fashion as in burst 610 with respect to the nominal spacing 106 (FIG. 1). Pulse 2 in burst 620 is separated from pulse 1 in burst 620 by spacing 202, wherein spacing 202 is less than nominal spacing 106. In addition, pulse 2 in burst 620 is separated from pulse 3 in burst 620 by spacing 204, wherein spacing 204 is greater than nominal spacing 106. Pulse 4 in burst 620 is separated from pulse 3 in burst 620 by spacing 204, wherein spacing 204 is greater than nominal spacing 106. In addition, pulse 4 in burst 620 is separated from pulse 5 in burst 620 by spacing 202, wherein spacing 202 is less than nominal spacing 106.

Pulse 2 in burst 630 is separated from pulse 1 in burst 630 by spacing 204, wherein spacing 204 is greater than nominal spacing 106. In addition, pulse 2 in burst 630 is separated from pulse 3 in burst 630 by spacing 202, wherein spacing 202 is less than nominal spacing 106. Pulse 4 in burst 630 is separated from pulse 3 in burst 630 by spacing 202, wherein spacing 202 is less than nominal spacing 106.

In the illustrated embodiment of FIG. 6, the spacings between the pulses in burst 640 have been altered in similar fashion as in burst 630 with respect to the nominal spacing 106 (FIG. 1A). Pulse 2 in burst 640 is separated from pulse 1 in burst 640 by spacing 204, wherein spacing 204 is greater than nominal spacing 106. In addition, pulse 2 in burst 640 is separated from pulse 3 in burst 640 by spacing 202, wherein spacing 202 is less than nominal spacing 106. Pulse 4 in burst 640 is separated from pulse 3 in burst 640 by spacing 202, wherein spacing 202 is less than nominal spacing 106.

FIG. 7 shows Applicants' servo pattern 700. The spacings between the pulses in bursts 710 and 720 have been altered with respect to the nominal spacing 106 (FIG. 1A) to encode a first bit of information. In addition, the spacings between the pulses in bursts 730 and 740 have been altered with respect to the nominal spacing 106 (FIG. 1A) to encode parity bit for error-correction purposes. Using Applicants' method, servo pattern 700 thus encodes two bits, the first representing a bit of information, the second representing a parity bit for error-correction purposes. In certain embodiments, those two bits represent the pair of binary symbols (0,1), where the information bit takes the logical value '0' and the parity bit takes the logical value '1'. Note that the introduction of the parity bit does not affect the computation of the y-position estimate, as the sum of the A intervals and the sum of the B intervals yield the same value as in the case of nominal spacings (FIG. 1C).

Pulse 2 in burst 710 is separated from pulse 1 in burst 710 by spacing 204, wherein spacing 204 is greater than nominal spacing 106. In addition, pulse 2 in burst 710 is separated from pulse 3 in burst 710 by spacing 202, wherein spacing 202 is less than nominal spacing 106. Pulse 4 in burst 710 is separated from pulse 3 in burst 710 by spacing 202, wherein spacing 202 is less than nominal spacing 106. In addition, pulse 4 in burst 710 is separated from pulse 5 in burst 710 by spacing 204, wherein spacing 204 is greater than nominal spacing 106.

In the illustrated embodiment of FIG. 7, the spacings between the pulses in burst 720 have been altered in similar fashion as in burst 710 with respect to the nominal spacing 106 (FIG. 1A). Pulse 2 in burst 720 is separated from pulse 1 in burst 720 by spacing 204, wherein spacing 204 is greater than nominal spacing 106. In addition, pulse 2 in burst 720 is separated from pulse 3 in burst 720 by spacing 202, wherein spacing 202 is less than nominal spacing 106. Pulse 4 in burst 720 is separated from pulse 3 in burst 720 by spacing 202, wherein spacing 202 is less than nominal spacing 106. In addition, pulse 4 in burst 720 is separated from pulse 5 in burst 720 by spacing 204, wherein spacing 204 is greater than nominal spacing 106.

Pulse 2 in burst 730 is separated from pulse 1 in burst 730 by spacing 202, wherein spacing 202 is less than nominal spacing 106. In addition, pulse 2 in burst 730 is separated from pulse 3 in burst 730 by spacing 204, wherein spacing 204 is greater than nominal spacing 106. Pulse 4 in burst 710 is separated from pulse 3 in burst 710 by spacing 204, wherein spacing 204 is greater than nominal spacing 106.

In the illustrated embodiment of FIG. 7, the spacings between the pulses in burst 740 have been altered in similar fashion as in burst 730 with respect to the nominal spacing 106 (FIG. 1A). Pulse 2 in burst 740 is separated from pulse 1 in burst 740 by spacing 202, wherein spacing 202 is less than nominal spacing 106. In addition, pulse 2 in burst 740 is separated from pulse 3 in burst 740 by spacing 204, wherein spacing 204 is greater than nominal spacing 106. Pulse 4 in burst 740 is separated from pulse 3 in burst 740 by spacing 204, wherein spacing 204 is greater than nominal spacing 106.

In certain embodiments, Applicants' sequential information storage medium comprises a plurality of servo pattern encoded sequentially along its length. In certain embodiments, Applicants' method aggregates the information encoded in a sequential plurality of servo patterns to form one or more words. In certain embodiments, Applicants' method aggregates the information encoded in 36 sequential servo patterns to form three words, wherein the information encoded in four sequential servo patterns comprises manufacturer information, and wherein the information encoded in eight sequential servo patterns comprises sync information, and wherein the information encoded in twenty-four (24) sequential servo patterns comprises LPOS information.

Using the prior art servo patterns of FIGS. 2 and 3, the four sequential servo patterns which in combination are used to encode manufacturer information comprise, in the aggregate, 4 bits of information. Using Applicants' servo patterns of FIGS. 4, 5, 6, and 7, the four sequential servo patterns which in combination are used to encode manufacturer information comprise, in the aggregate, 4 bits of information and 4 parity bits. As those skilled in the art will appreciate, use of Applicants' servo patterns allows a higher reliability in the decoding of manufacturer information as compared to the use of prior art servo patterns.

Using Applicants' servo patterns of FIGS. 4, 5, 6, and 7, in certain embodiments Applicants' method to encode information in non-data portions of a sequential information storage medium encodes manufacturer information comprising four sequential servo bursts using a simple repetition code. In certain embodiments Applicants' method to encode information in non-data portions of a sequential information storage medium encodes manufacturer information comprising four sequential servo bursts using a more complex single-bit error-correcting extended Hamming code. Alternatively, stronger protection for the manufacturing information can be provided using Applicants' RS ECC described hereinbelow.

Using the prior art servo patterns of FIGS. 2 and 3, the eight sequential servo patterns which in combination are used to encode sync information comprise, in the aggregate, 8 bits of information. Using Applicants' servo patterns of FIGS. 4, 5, 6, and 7, the eight sequential servo patterns which in combination are used to encode sync information comprise, in the aggregate, 16 bits. As those skilled in the art will appreciate, use of Applicants' servo patterns allows the encoding of two times the amount of sync information as does use of prior art servo patterns that comprise error-correction capabilities for recovering LPOS information. In certain embodiments Applicants' method to encode information in non-data portions of a sequential information storage medium encodes sync information comprising a 16 bit sync pattern 1100000000000000. Note that the 16 bit sync pattern is obtained from the LTO sync pattern by using a repetition code. Applicants' 16 bit sync pattern provides enhanced robustness to noise.

Using the prior art servo patterns of FIGS. 2 and 3, the 24 sequential servo patterns which in combination are used to encode LPOS information comprise, in the aggregate, 24 bits of information. Using Applicants' servo patterns of FIGS. 4, 5, 6, and 7, Applicants' sequential 24 servo patterns used to encode LPOS information comprise, in the aggregate, 24 bits of information and 24 parity bits. As those skilled in the art will appreciate, use of Applicants' servo patterns allows a higher reliability in the decoding of LPOS information as compared to the use of prior art servo patterns.

In certain embodiments, use of Applicants' servo patterns increases the reliability of the manufacturer information, and/or the sync information, and/or the LPOS information, encoded in a sequential data storage medium, such as for example a magnetic tape. As described hereinabove, each of Applicants' servo patterns encodes 2 bits, wherein a first burst in combination with a second burst encode a first bit, and wherein a third burst in combination with a fourth burst encode a second bit. In certain embodiments of Applicants' method to encode information in non-data regions of a sequential data storage medium, each of Applicants' servo patterns encodes a first bit and a second bit, wherein the first bit comprises an information bit and the second bit comprises a "parity bit". In the case the embodiment of Applicants' method comprises a repetition code, in each servo pattern the second bit is decoded to comprise the same value as the first bit. In these embodiments using repetition coding, if a first bit encoded in one of Applicants' servo patterns cannot be read, then Applicants' method substitutes the decoded value of the second bit for the value for the unreadable first bit.

In certain embodiments, Applicants' method interprets a 24 bit LPOS word to comprise eight (8) distinct 3-bit symbols. Using Applicants' servo patterns in the above-described "parity bit" implementation, use of a Reed-Solomon error correction code ("RS ECC") allows for correction of corrupted 3-bit symbols.

In a preferred embodiment, the "RS ECC" is a [n=8, k=4, d=5] singly-extended Reed-Solomon (RS) code over the Galois field GF(8) where the codeword length is n=8 symbols, the code dimension is k=4 symbols and the minimum code distance is d=5, i.e., the code allows the correction of any two erroneous symbols within a 8-symbol RS code word or the correction of any one erroneous symbol and any two erased symbols within a 8-symbol RS code word or the correction of any four erased symbols within a 8-symbol RS code word. An erased symbol is an erroneous symbol whose location within the code word is known but the actual value of the erroneous symbol is not known.

Figure 11:
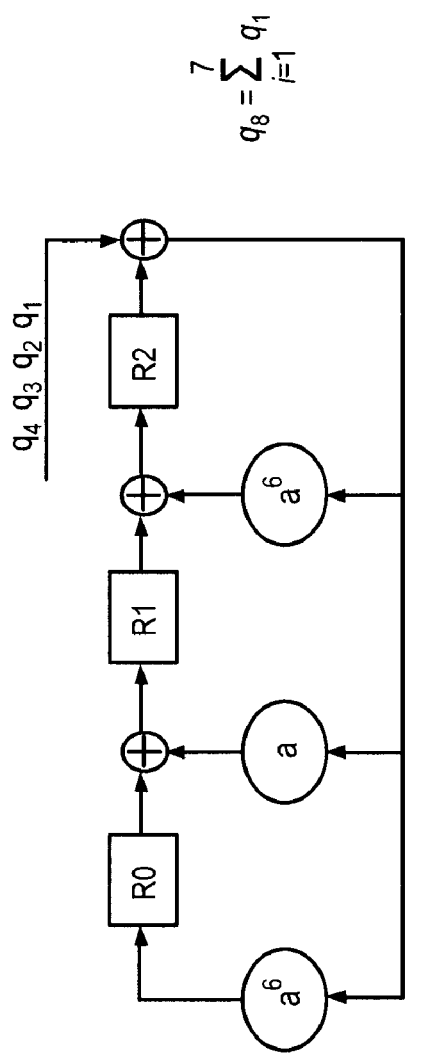
FIG. 11 illustrates the systematic encoder generating codewords from a [8,4,5] singly-extended Reed-Solomon code over Galois field GF(8)

It is worth mentioning that, in general, a Galois field has $p^m$ elements, where $p>1$ is a prime number and $m>0$ is an integer, and is referred to as $GF(p^m)$. In the preferred embodiment p=2 and m=3, therefore the symbols of the Reed-Solomon code from GF(8) are 8-ary and can be represented by a 3-bit row vector. For the preferred embodiment calculation in the Galois field GF(8) is defined by the primitive polynomial $P(x)=x^3+x+1$. A primitive element in GF(8) is a=(0 1 0). Furthermore, the generator polynomial for the preferred embodiment is $G(x)=(x+a)(x+a^2)(x+a^3)=x^3+a^6x^2+ax+a^6$, where addition and multiplication are defined in GF(8). FIG. 11 illustrates the exponential and binary notations for the computations in GF(8) and the systematic encoder generating codewords from a [n=8,k=4,d=5] singly-extended RS code over GF(8). The RS codewords are denoted by [$q_1$ $q_2$ $q_3$ $q_4$ $q_5$ $q_6$ $q_7$ $q_8$]. The first four symbols in each RS codeword $q_1$, $q_2$, $q_3$, $q_4$ are the information symbols that are to be RS encoded. Therefore, the encoder in FIG. 11 is a systematic encoder. The RS parity symbols $q_5$, $q_6$, $q_7$, $q_8$ are computed as a function of the information symbols $q_1$, $q_2$, $q_3$, $q_4$. As illustrated in FIG. 11 this computation is done using a feedback shift register circuit performing additions and multiplications in GF(8). Thereby, all the registers of the feedback shift register circuit are initially set to the 0 symbol in GF(8). Registers R0, R1 and R2 are 3 bits wide. Information symbols $q_1$, $q_2$, $q_3$, $q_4$ are then fed sequentially into the encoder. After the requisite symbols have been processed, the content of R2 is $q_5$ and that of R1 is $q_6$ and that of R0 is $q_7$. An overall parity symbol $q_8$ is added as the last parity symbol at the end of the RS codeword.

Figure 8A:
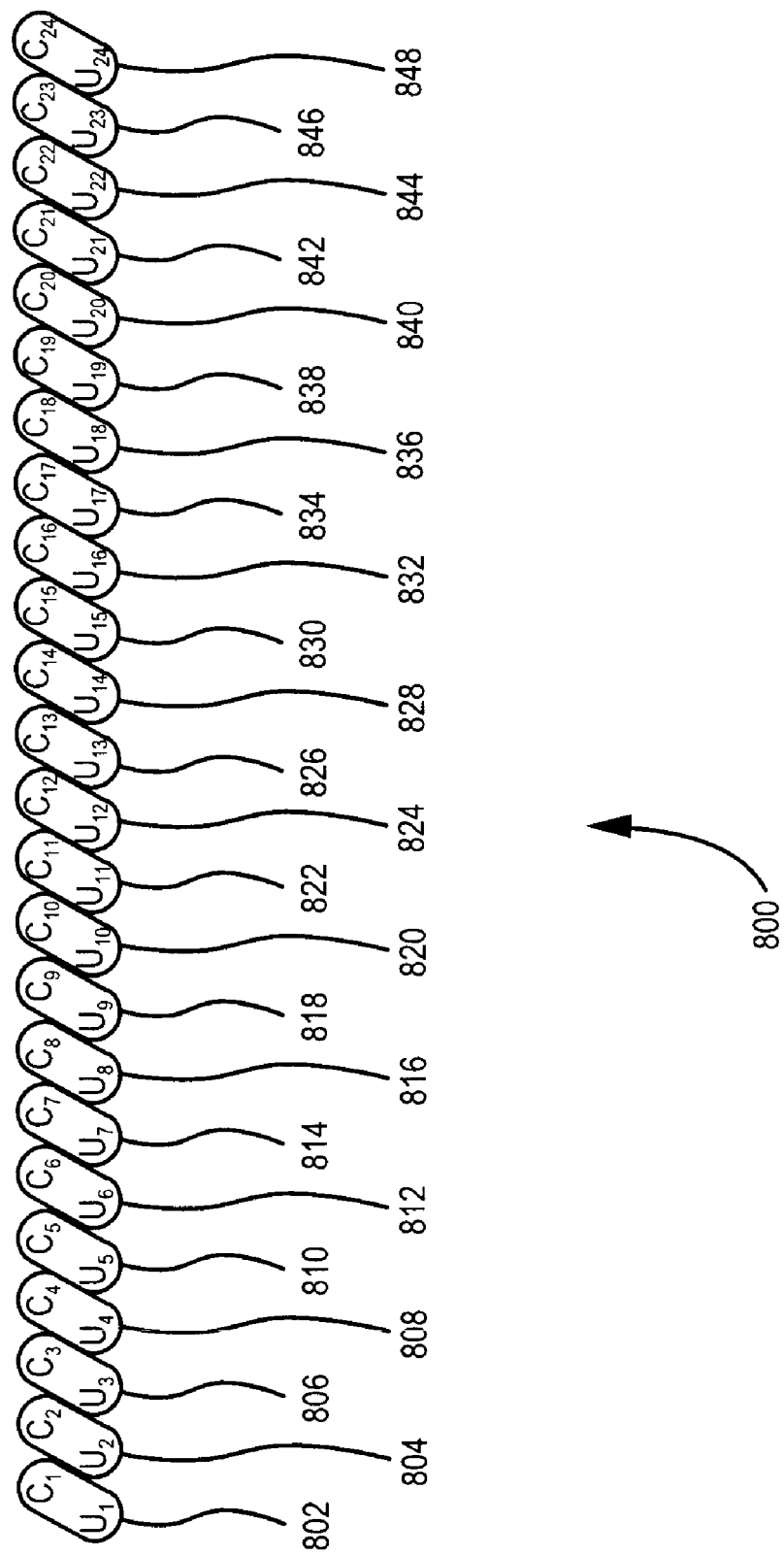
FIG. 8A shows 24 sequential servo patterns used to encode an LPOS word.

Referring now to FIG. 8A, LPOS word 800 comprises 24 sequential servo patterns, namely sequential servo patterns 802, 804, 806, 808, 810, 812, 814, 816, 818, 820, 822, 824, 826, 828, 830, 832, 834, 836, 838, 840, 842, 844, 846, and 848. Each of these 24 servo patterns encodes two bits. For example, servo pattern 802 encodes bit $U_1$ and bit $C_1$, wherein the spacings of the pulses in a first burst and the spacings of the pulses in a second burst encode bit $U_1$ (information bit), and wherein the spacings of the pulses in a third burst and the spacings of the pulses in a fourth burst encode bit $C_1$ (parity bit). For reasons of compatibility with legacy LTO hardware the bit encoded by the spacings of the pulses in a first burst and the spacings of the pulses in a second burst is selected to be the LPOS information bit in an LPOS word as specified in LTO.

Figure 8B:
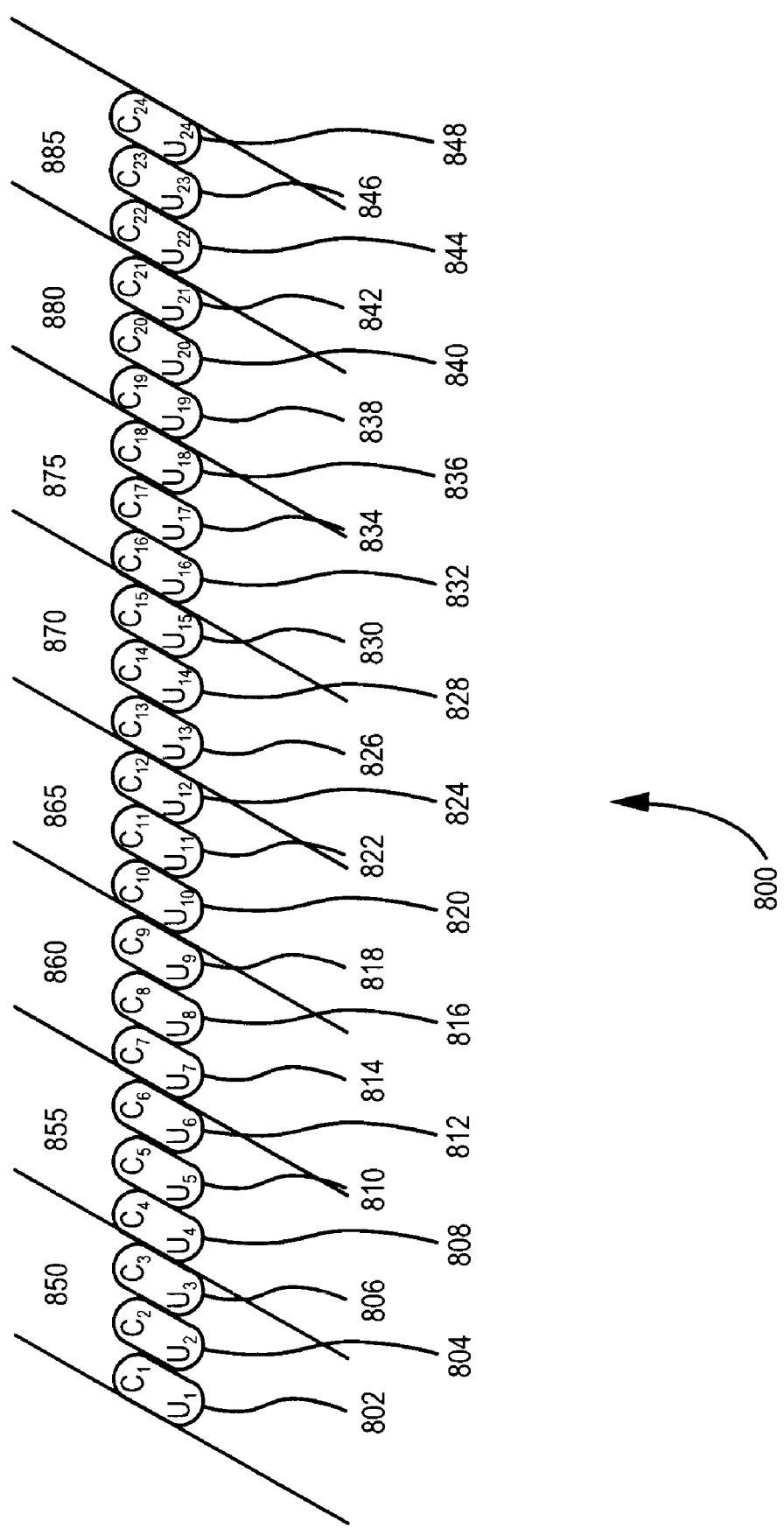
FIG. 8B shows the LPOS word of FIG. 8A comprising eight 3-bit symbols.

Referring now to FIG. 8B, 24 information bits in an LPOS word are encoded by two interleaved RS codewords 800. The two interleaved RS codewords 800 comprise eight pairs of 3-bit symbols, namely pairs of 3-bit symbols 850, 855, 860, 865, 870, 875, 880, and 885. Each pair of symbols in GF(8) consist of an information symbol [$U_{3i+1}$, $U_{3i+2}$, $U_{3i+3}$], where i=0, . . . ,7, and of a parity symbol [$C_{3i+1}$, $C_{3i+2}$, $C_{3i+3}$], where i=0, . . . ,7. Using Applicants' servo patterns of FIGS. 4, 5, 6 and 7, i.e. using Applicants' "parity bit" encoding, and using Applicants' RS ECC, Applicants' method to encode information in non-data portions of a sequential information storage medium can correct up to two of the eight 3-bit symbols in each RS codeword comprised in 800. In addition, using Applicants' servo patterns of FIGS. 4, 5, 6 and 7, i.e. using Applicants' "parity bit" encoding, and using Applicants' RS ECC, Applicants' method can correct any burst of 8 bits $[U_j, C_j, U_{j+1}, C_{j+1}, U_{j+2}, C_{j+2}, U_{j+3}, C_{j+3}]$, where $1<=j<=21$, or $[C_j, U_{j+1}, C_{j+1}, U_{j+2}, C_{j+2}, U_{j+3}, C_{j+3}, U_{j+4}]$, where $1<=j<=20$, in 800, corresponding to an 0.8 mm burst error correction.

In certain embodiments, the 24 sequential servo patterns of FIG. 8A thus encode the 24-bit longitudinal position information as two interleaved RS codewords, wherein each RS codeword comprises eight 3-bit symbols $[q_1\ q_2\ q_3\ q_4\ q_5\ q_6\ q_7\ q_8]$. For example, and referring now to FIGS. 8A, 8B, 9, and 10, the 24 servo patterns of FIG. 8A encode a first RS codeword 900 and a second RS codeword 1000, where pairs of symbols from GF(8) that belong to an RS codeword are shown in FIG. 8B. The first RS codeword 900 comprises four pairs of 3-bit symbols 910, 920, 930, and 940, where $q_1=[U_1, U_2, U_3]$, $q_2=[U_7, U_8, U_9]$, $q_3=[U_{13}, U_{14}, U_{15}]$, $q_4=[U_{19}, U_{20}, U_{21}]$, $q_5=[C_1, C_2, C_3]$, $q_6 32\ [C_7, C_8, C_9]$, $q_7=[C_{13}, C_{14}, C_{15}]$, $q_8=[C_{19}, C_{20}, C_{21}]$, The second RS codeword 1000 comprises four pairs of 3-bit symbols 1010, 1020, 1030, and 1040, where $q_1=[U_4, U_5, U_6]$, $q_2=[U_{10}, U_{11}, U_{12}]$, $q_3=[U_{16}, U_{17}, U_{18}]$, $q_4=[U_{22}, U_{23}, U_{24}]$, $q_5=[C_4, C_5, C_6]$, $q_6=[C_{10}, C_{11}, C_{12}]$, $q_7=[C_{16}, C_{17}, C_{18}]$, $q_8=[C_{22}, C_{23}, C_{24}]$. The first RS codeword 900 is interleaved with the second RS codeword 1000.

In certain embodiments, the 4-bit manufacturer information $[t_1\ t_2\ t_3\ t_4]$ in an LPOS word as specified by LTO are encoded using a $[n=8, k=4, d=4]$ extended Hamming code over Galois field GF(2) where the codeword length is $n=8$ bits, the code dimension is $k=4$ bits and the minimum code distance is $d=4$, i.e., the code allows the correction of any one erroneous bit within a 8-bit extended Hamming codeword. FIG. 12 illustrates the systematic encoding rule for generating codewords from a $[n=8, k=4, d=4]$ extended Hamming code over GF(2). The extended Hamming codewords are denoted by $[t_1\ t_2\ t_3\ t_4\ p_1\ p_2\ p_3\ p_4]$. The first four bits in each codeword $t_1, t_2, t_3, t_4$ are the information bits that are to be encoded. Therefore, the encoding rule in FIG. 12 defines a systematic encoder. The parity bits $p_1, p_2, p_3, p_4$ are computed as a function of the information bits $t_1, t_2, t_3, t_4$. According to the Applicants' "parity bit" encoding method, the codeword is written by interleaving the information bits and the parity bits. Each servo pattern therefore encodes a pair of bits $(t_i, p_i)$, $i=1,2,3,4$. A bit encoded by the spacings of the pulses in a first burst and the spacings of the pulses in a second burst is selected to be a manufacturer information bit, whereas a bit encoded by the spacings of the pulses in a third burst and the spacings of the pulses in a fourth burst is selected to be a parity bit.

An advantage of using Applicants' "parity bit" encoding consists in avoiding the decoding delay that is incurred by prior art servo patterns that comprise error-correction capabilities for recovering LPOS information.

A further advantage of using Applicants' "parity bit" encoding consists in keeping intact the original LPOS word as specified for LTO tape drives. Therefore, legacy hardware can read the new format without any modification.

Applicants' invention further comprises an article of manufacture, such as and without limitation a tape drive apparatus, a data storage controller, an automated data storage library, a host computing device comprising a storage management program and in communication with a data storage library, wherein that article of manufacture comprises a computer readable medium comprising computer readable program code comprising a series of computer readable program steps to effect encoding a plurality of Applicants' servo patterns in one or more non-data regions of a sequential information storage medium, and/or decoding information encoded in a plurality of Applicants' servo patterns, and/or utilizing Applicants' Reed-Solomon error correction code to correct errors in information read from a sequential information storage medium comprising a plurality of Applicants' servo patterns encoded in one or more non-data regions of the storage medium.

Applicants' invention further includes a computer program product encoded in a computer readable medium and usable with a computer processor to encode a plurality of Applicants' servo patterns in one or more non-data regions of a sequential information storage medium, and/or decode information encoded in a plurality of Applicants' servo patterns, and/or utilize Applicants' Reed-Solomon error correction code to correct errors in information read from a sequential information storage medium comprising a plurality of Applicants' servo patterns encoded in one or more non-data regions of the storage medium.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to encode linear position information in a sequential data storage medium, comprising the steps of:
   encoding (N) sequential servo patterns along a portion of said sequential data storage medium, wherein (N) is greater than 1;
   wherein each of said plurality of servo patterns encodes a first longitudinal position (LPOS) bit and a second LPOS bit, and wherein said (N) servo patterns in combination encode a total of (2N) LPOS bits;
   wherein each of said encoded (N) LPOS servo patterns comprise:
   a first burst comprising a first plurality of pulses;
   a second burst comprising a second plurality of pulses;
   a third burst comprising a third plurality of pulses;
   a fourth burst comprising a fourth plurality of pulses;
   wherein the spacings between said first plurality of pulses comprising said first burst, in combination with the spacings between said second plurality of pulses comprising said second burst, encode said first LPOS bit;
   wherein the spacings between said third plurality of pulses comprising said third burst, in combination with the spacings between said fourth plurality of pulses comprising said fourth burst, encode said second LPOS bit;
   wherein, for each of said (N) servo patterns, said first LPOS bit comprises an information bit and said second LPOS bit comprises a parity bit;
   further comprising the step of correcting any sequence of 8 consecutive LPOS bits using a Reed-Solomon error correction code.

2. The method of claim 1, wherein (N) equals 24, said method further comprising the steps of:
   decoding eight 3-bit codeword symbols;
   correcting up to 2 different 3-bit codeword symbols using a Reed-Solomon error correction code.

3. The method of claim 1, further comprising the steps of:
   decoding a first LPOS word comprising eight 3-bit codeword symbols;

decoding a second LPOS word comprising eight 3-bit codeword symbols;

wherein said first LPOS word is interleaved with said second LPOS word.

4. The method of claim 3, further comprising the step of correcting up to two of said eight 3-bit codeword symbols comprising said first LPOS word.

5. The method of claim 3, further comprising the step of correcting up to two of said eight 3-bit codeword symbols comprising said second LPOS word.

6. A method to encode sync, manufacturer, and longitudinal position, information in a sequential data storage medium, comprising the steps of:

encoding (N) sequential servo patterns along a portion of the length of a sequential data storage medium, wherein (N) is greater than 1;

wherein each of said plurality of servo patterns encodes a first bit and a second bit, and wherein said (N) servo patterns, in combination, encode a total of (2N) bits;

wherein said sequential data storage medium comprises a magnetic tape;

wherein for each of said (N) servo patterns comprises:

a first burst comprising a first plurality of pulses;

a second burst comprising a second plurality of pulses;

a third burst comprising a third plurality of pulses;

a fourth burst comprising a fourth plurality of pulses;

wherein the spacings between said first plurality of pulses comprising said first burst, in combination with the spacings between said second plurality of pulses comprising said second burst, encodes a first bit;

wherein the spacings between said third plurality of pulses comprising said third burst, in combination with the spacings between said fourth plurality of pulses comprising said fourth burst, encodes a second bit;

wherein (N) is 36;

wherein said encoding step further comprises the steps of:

encoding sync information using 8 sequential servo patterns, wherein each servo pattern encodes 2 bits of sync information.

7. The method of claim 6, wherein said sync information comprises the 16 bit pattern 1100000000000000.

8. The method of claim 6, further comprising the step of encoding manufacturer information using 4 sequential servo patterns, wherein each servo pattern encodes 1 bit of manufacturer information and 1 parity bit.

9. The method of claim 8, wherein said manufacturer information is encoded using a simple repetition code.

10. The method of claim 8, wherein said manufacturer information is encoded using a single-bit error correcting Hamming code.

* * * * *